July 28, 1953  W. J. RHEINGANS ET AL  2,646,812
HYDRAULIC TURBINE GOVERNING SYSTEM
Filed Nov. 16, 1948
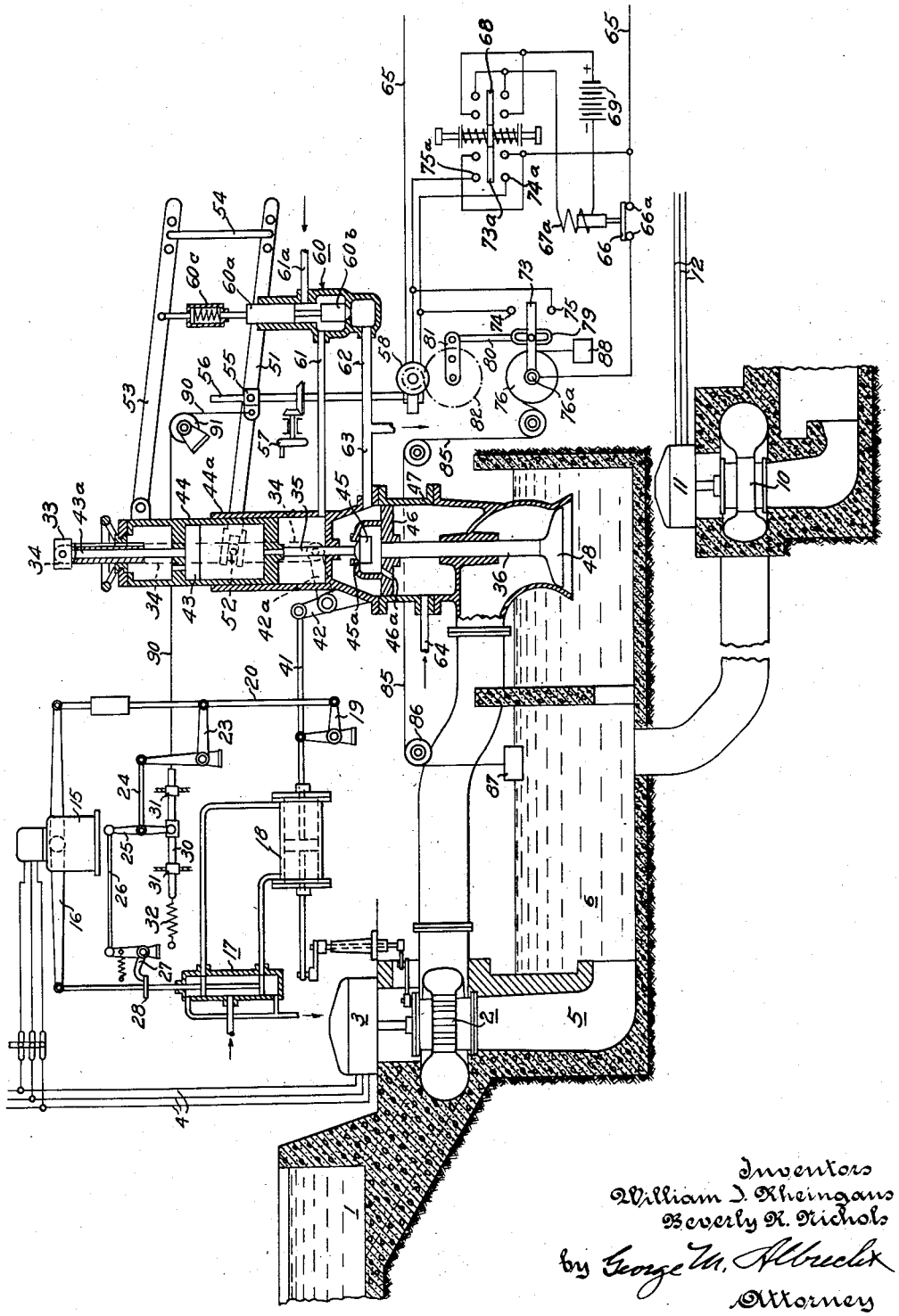
Inventors
William J. Rheingans
Beverly R. Nichols
by George M. Albrecht
Attorney Patented July 28, 1953

2,646,812

UNITED STATES PATENT OFFICE 2,646,812

HYDRAULIC TURBINE GOVERNING SYSTEM

William J. Rheingans and Beverly R. Nichols, Wauwatosa, Wis., assignors to Allis-Chalmers Manufacturing Company, Milwaukee, Wis., a corporation of Delaware Application November 16, 1948, Serial No. 60,336

17 Claims. (Cl. 137—25)

This invention relates to systems for governing the operation of either a single hydraulic turbine or a plurality of hydraulic turbines in a so-called "stream flow" installation or in any installation of similar nature. The principal object of the invention is the provision of new and improved governing systems of these types.

The invention may be applied where a stream of water is available which is adequate for operating a hydraulic turbine, whether the stream be an open stream or a confined stream as for example in conduit means of a water supply system, where it is not practical to provide a reservoir to store water not used by the turbine. In such an installation the governing system must control the turbine responsive to varying demands for power thereon and must also bypass the full stream flow when there is no demand for power. Accordingly, it is an object of the invention to so interlock the control means for the bypass means with the turbine gate limit means of a speed governor that the bypass means will operate normally when the turbine gates are opened an amount limited by the gate limit adjustment, and if for any reason the turbine gates are moved from said limit toward closed position the bypass will be caused to open and remain open by an amount to compensate for the decrease in turbine gate opening.

If, instead of a single turbine, a number of turbines are to use the stream flow in series and particularly if the tailrace or discharge of one turbine which supplies power to one electrical network, is actually the forebay for another turbine supplying power to another electric network, a further problem is involved, and accordingly another object of the invention is to provide a hydraulic turbine installation through which the full flow of a stream is to be passed at all normal times and which utilizes as much of the flow for power generation as is permitted by the load limit means but does not adversely affect the operation of another turbine immediately downstream from the first turbine.

Another object of the invention is to provide a governing system for hydraulic turbines in which the control means of a bypass means valve is adjusted responsive to variations in level in the water discharged from the turbine.

Another object of the invention is to provide means by which the operation of the servomotor actuating both the gates of a hydraulic turbine and a bypass means for such turbine, is varied dependent on the position of a float in the tailrace of the turbine.

Objects and advantages other than those above set forth will be apparent as the description of the invention proceeds.

The novel features of the invention and how the objects are attained will appear from this specification and the accompanying drawing showing one embodiment of the invention and forming a part of this application, and all of these novel features are intended to be pointed out in the claims.

Generally, the present invention is to be employed for controlling both the gates of a turbine, which may be one of the known types of reaction or impulse hydraulic turbines, and the means for bypassing water flow around the turbine upon closing movement or complete closure of the gates. If there are a plurality of turbines, then the turbine referred to will be the upstream turbine. The bypass means may be of the general type of pressure regulator shown in Patent 2,308,135 to W. M. White, January 12, 1943, its construction, arrangement and mode of operation being altered to perform functions in addition to those performed by a conventional pressure regulator, as will appear. A speed governor, which may be of the type shown in Patent 2,106,684, to J. J. Ring et al., January 25, 1938, is employed to control the movement of a pilot valve for admitting fluid pressure to a servomotor for actuating the turbine gates and assisting in actuating the bypass means.

As will more fully appear, a bypass control leverage with an adjustable fulcrum, controls the opening and closing of the bypass means. Two means are provided for operating the bypass control leverage. The first means comprises a load limit mechanism with a second adjustable fulcrum (the load limit mechanism relays movement of the servomotor to the speed governor and modifies the action thereof on the pilot valve) and hand or power operated means for adjusting the second fulcrum coordinated with the adjustable fulcrum of the bypass control leverage so that adjustment of the load limit mechanism for increased load tends to cause the bypass means to open, and vice versa adjustment of the load limit for decreased load tends to cause the bypass means to close. The second means provided to adjust the bypass control leverage comprises a leverage responsive to movement of the gate operating servomotor and tends to oppose the tendency of the first means and adjust the bypass control leverage to close the bypass means upon gate opening motion of the servomotor due to increased load, and vice versa open bypass means upon gate closing movement of the servomotor due to decreased load. The opposing tendencies of these two means for adjusting the bypass control leverage are arranged to completely neutralize each other and close the bypass means when the gates are opened the maximum permitted by the load limit mechanism. If the load limit is raised above the actual load on the turbine or if the servomotor moves the gates in a closing direction due to decreased load below the setting of the load limit, the aforesaid opposing tendencies of the two adjusting means will impose upon the bypass control leverage a net adjustment that will open the bypass means to discharge the difference between the maximum flow through the turbine as determined by the load limit and the actual discharge through the turbine determined by the load on the turbine. Power operated means is provided for adjusting the fulcrums of the bypass control leverage and the load limit mechanism, responsive to water level variations in the afterbay or tailrace of the turbine. Power and/or hand operable means is also provided to permit the operator to make the hereinbefore described adjustments at will. With the afterbay water level sensitive means functioning as described, the system is responsive both to the load on the turbine and to the quantity of water flowing therethrough.

Referring particularly to the drawing, this shows, for the sake of completeness, an embodiment of the invention in which two turbines are employed, but this embodiment includes apparatus to be employed in an embodiment which includes only one turbine as will fully appear. In the drawing a forebay 1 is provided for a hydraulic turbine 2 driving an electric generator 3 supplying power to an electric network 4. The turbine 2 discharges by way of a draft tube 5 into a space or tailrace 6 which is the forebay for a downstream turbine 10 driving a generator 11 and supplying power to another electric network 12. The downstream turbine 10 may be provided with a pressure regulator (not shown) of the general type shown in the beforementioned White patent or any other suitable pressure regulator or bypass means.

In the present installation, it is assumed to be impractical to provide sufficient reservoir space ahead of either of the turbines, so that a full flow of the stream must either be used by the turbines in series or bypassed at least around the upstream turbine through a bypass discharging to the forebay of the downstream turbine and/or over the usual spillway for the upstream turbine. It is accordingly required that the water level in the tailrace-forebay 6 be kept at or below a level such as not to drown out the downstream turbine. The operations of the turbines cannot be synchronized because the two turbines deliver power to different electric lines and hence are subjected to differently variable loads.

When the turbine 2 is required to supply power, the speed governor 15 thereof so adjusts a floating lever 16 that a pilot valve 17 admits pressure fluid to the right hand end of a servomotor 18 for opening the turbine gates. The servomotor movement also acts through a bell crank 19 on a rod 20 connected with one end of the floating lever 16, the usual relay connection being thus provided. The rod 20 is also connected at an intermediate point with a leverage for relaying the movement of the servomotor to means for limiting gate opening action of the pilot valve 17 by the speed governor 15. Such leverage includes a bell crank 23 connected at one end with the rod 20, the other end of the bell crank being connected by a link 24 with a lever 25 connected at one end by a rod 26 with a bell crank 27 of which one end is engageable with a stop 28 on the stem of valve 17 for limiting movement in the gate opening direction of such valve.

One end of lever 25 is fulcrumed on a rod 30 slidably supported in bearings 31 and urged toward the left by a spring 32. The position of fulcrum rod 30 is variable by means responsive to the level of water in the tailrace-forebay 6, or at will by an operator, regardless of whether there is means responsive to water level, all as will be described hereinafter. When the servomotor 18 moves in gate opening direction (that is, toward the left as viewed in the drawing) bell crank 19 is swung counterclockwise to lift rod 20 which shifts lever 16 in a direction tending to move valve 17 to its neutral position. Such lifting movement of rod 20 also swings bell crank 23 counterclockwise which acts through link 24 to tend to swing lever 25 counterclockwise and thereby act through rod 26 on bell crank 27 and press the end of such bell crank in contact with stop 28.

The servomotor is here shown as adapted to move a rod 41 here shown as pivotally connected at one end to an arm of the bell crank 19 and pivotally connected at the other end to an arm of a bell crank 42. Desirably, the other arm of the bell crank 42 is bifurcated, one of the furcations, 42a, being shown. The bifurcated arm of the bell crank 42 has links respectively pivotally connected at one end to the furcations and pivotally connected at the other end to a yoke 33, one of the links, 34, being shown, connected to the furcation 42a and to the yoke 33.

The yoke 33 is fastened to a rod 43a of a piston 43 movable in a dashpot cylinder 44. The dashpot cylinder 44 cooperates with another cylinder 44a. On a rod 35 carried by the cylinder 44 is a valve body 45 cooperable with a valve seat 45a provided on a piston 46 in a cylinder 47. The construction and arrangement is such that when the valve body 45 moves downwardly relatively to the valve seat 45a, thereby opening the valve, fluid can pass through the opened valve to the drain pipe 63. The piston 46 is connected by a rod 36 to a valve body 48 which is adapted to close the discharge end of a bypass conduit connected to the upstream side of the turbine 2; so that when the valve body 45 is moved toward open position, the valve body 48 is moved toward open position, thus bypassing water around the turbine 2 into the tailrace-forebay 6.

A bypass control leverage is connected to move in unison with the yoke 33 and with the dashpot 44 of the bypass means and comprises a lever 51 having a forked end engaging a block 52 pivoted on the link 34; and a second lever 53 pivotally connected at one end with the dashpot 44 of the bypass means. The two levers 51 and 53 are adjustably and pivotally connected adjacent their other ends by a link 54. The bypass control includes also an adjustable fulcrum comprising a nut 55 pivotally connected with the lever 51 and cooperable with a screw 56 which may be rotated manually by a hand wheel 57 or may be driven by a reversible electric motor 58.

The bypass control leverage above described is here shown as having the lever 53 connected with a valve assembly 60 having a valve body 60b which in the position shown is seated on a valve seat for closing communication with a drain pipe 62; and in said position permits communication between a pipe 61a for supplying pressure fluid and a pipe 61 connected to the space in the cylinder 44a below the dashpot cylinder 44.

The valve body 60b is operable by a valve stem 60a which is pivotally connected by a spring link 60c of known form to the lever 53. The spring link 60c permits clockwise movement of the lever 53 even though the valve body 60b is seated as hereinbefore described.

Pressure fluid in the cylinder 44a resists downward movement of the dashpot cylinder 44 until valve body 60b is moved upwardly to permit escape of pressure fluid, from below cylinder 44, by way of pipe 61 to drain pipe 62.

Pressure fluid is constantly admitted to the power cylinder 47 of the bypass means below the piston 46 by a pipe 64, and under the control of valve 45, acts on the power piston 46 to lift and close the valve 48 under conditions to be described. Pressure fluid can drain from power cylinder 47 by pipe 63 from above the piston 46 at all times, and from below the piston 46 through a hole 46a when the dashpot movement opens valve 45.

The electric motor 58 is energizable from an electric supply line 65 when contacts 66a are bridged by a contact 66 biased toward bridging position. For a purpose which will appear, a solenoid 67a when energized is adapted to move contact 66 to open position. The solenoid 67a is here shown as energizable from a battery 69 when a movable contact 68 is in engagement with relatively stationary contacts in either one of its limiting positions, below or above the contact 68, as viewed in the drawing.

The direction of rotation of motor 58 is controllable by either one of two switches, one of which comprises a movable contact 73 and fixed contacts 74 and 75. The movable contact 73 may be frictionally carried on a shaft 76a of a drum 76. Any suitable means may be provided for restoring the contact 73 to its intermediate position in response to rotation of the motor 58. Such means is here diagrammatically shown as comprising a lost motion connection between the contact 73 and a rod 80 in turn connected with a crank 81 operable by a gear 82 driven by a pinion on the shaft of the motor 58. The lost motion connection is here shown as comprising a pin on the contact arm 73 cooperating with a slot in a portion of the rod 80. The drum 76 has wound thereon a cable 85 running over a sheave 86 and connected with a float 87 rising and falling with the level of water in the tailrace-forebay 6, the cable 85 being wrapped around drum 76 and kept taut by weight 88.

The nut 55 forming the adjustable fulcrum for the bypass control leverage described above is here shown as connected by way of a cable 90 which runs over a sheave 91, with one end of the adjustable fulcrum carrying rod 30 for the leverage by which servomotor movements are relayed to the pilot valve 17 for limiting opening movement thereof. While the connection between the nut 55 and the fulcrum carrying rod 30 has been shown as a particular mechanical connection, it will be apparent that any other suitable means serving the same purpose may be employed.

Assuming that both turbines are in operation and under sufficient load to use the full stream flow, the gates of both turbines will be fully opened and the discharge from turbine 2 will pass through turbine 10 and on downstream therefrom. When the load on the network 4 is decreased, the gates of turbine 2 are partially closed by the action of speed governor 15 on the pilot valve 17 to admit pressure fluid to the left hand end of the servomotor 18. The servomotor then acts through the linkage 41, 42, 34, and the yoke 33 to move the piston 43 downwardly, thereby causing the block 52 to swing the lever 51 counterclockwise about its pivot on the nut 55. This causes the link 54 to swing the lever 53 counterclockwise about its pivot on the cylinder 44 and moves the valve 60b toward the position in which pressure fluid is wholly or partly cut off from pipe 61a by the upper end of valve 60b and pipe 61 is wholly or partly connected by the lower end of valve 60b to the drain pipe 62, thus permitting the cylinder 44 to move downwardly and move the valve 45 toward open position. Opening of valve 45 allows pressure fluid to drain from below the piston 46 through hole 46a to drain pipe 63. When the valve 48 is in a closed position there is a downward force exerted upon the valve 48 by the water bypassed around the turbine 2. The valve 48 will remain closed only if the fluid pressure beneath the piston 46 is enough to balance the downward pressure on the valve 48. The opening of the valve 45 reduces the upward force on the piston 46 and results in downward movement of the valve 48 due to the now unbalanced pressure of the water on the upper surface of the valve 48. The amount of this downward force acting upon the valve 48 will be determined by the water level in the forebay 1. It will be evident that downward movement of cylinder 44 tends to return valve 60b to the position shown and that downward movement of piston 46 and hence valve 48 tends to reclose valve 45, the net effect of all of the leverage movements being to bring the valve 48 to a position and maintain it in a position in which the amount of water passed through the valve 48 compensates for the reduction in flow through the turbine 2 below the maximum permitted by the load limit. Thus the maximum flow permitted by the setting of the load limit mechanism is delivered downstream of turbine 2 regardless of the load on turbine 2 and regardless of the action of speed governor 15 in partially or completely closing the gates of turbine 2.

It will, of course, be obvious that, if there is an increase of load on the turbine 2 approaching the maximum load permitted by the load limit means, more water will be permitted to pass through the turbine 2 and less through the valve 48 until the load on the turbine corresponds to the maximum permitted by the load limit mechanism, at which time the valve 48 will be completely closed.

It is evident that the foregoing described operations will take place whether or not a downstream turbine, such as turbine 10, is involved in the system and hence the apparatus which performs said operations may be used for controlling an installation involving only a single turbine, such as turbine 2. However, if a downstream turbine is involved, and if the load on network 12 decreases so that the gates of turbine 10 are closed partially and if the pressure regulator or bypass means for such turbine does not open, the level of water in the tailrace-forebay 6 rises and it is necessary to obtain such action of the bypass means for turbine 2 as will close the valve 48 thereof if said valve is open. Assuming that switch 66 bridges contacts 66a, float 87 rising with the rising level of water in the forebay 6 allows the drum 76 to be rotated by the weight 88 to bring movable contact 73 into engagement with contact 75. Motor 58 is then so energized as to rotate in the direction to lower the fulcrum nut 55 to insure movement of valve 60b to admit pressure fluid to cylinder 44a to close valve 45, thereby to insure closure of valve 48. Lowering of the fulcrum nut 55 tensions cable 90 which shifts fulcrum rod 30 toward the right and such shifting of fulcrum rod 30 swings lever 25 counterclockwise to push on rod 26 and to swing bell crank 27 into contact with the load limit stop 28, thus positively moving valve 17 into its neutral position, if such valve is not already in such position.

If there is a decrease of water level in the tailrace-forebay 6, the float 87 descends thereby causing contact 73 to engage contact 74. This energizes motor 58 to run in such direction as to raise the fulcrum nut 55 thereby causing cable 90 to be moved by spring 32. The resultant movement of rod 30 causes the load limit finger 27 to back away from the stop 28, so that the pilot valve 17 may be moved upwardly to the gate-opening position by the governor 15. Thus the turbine 2 is permitted to take on more load and more water is discharged through turbine 2 into the tailrace-forebay 6.

For the purpose of controlling the motor 58 independently of the float 87, a two way push button switch having a movable contact 73a may be provided. The contact 73a is engageable with either a pair of contacts 74a or a pair of contacts 75a, one of the contacts 74a and one of the contacts 75a being connected to the live side of the pair of contacts 66a, the other contact 74a being connected electrically to the contact 74, and the other contact 75a being electrically connected to the contact 75. The contact 68 is mounted for movement in unison with the contact 73a, and hence when the contact 73a is moved into engagement with either pair of contacts 74a or 75a, the contact 68 will cause energization of the solenoid 67a, thereby moving contact 66 to open position. This prevents the float controlled contact 74 from exerting any control on the motor 58. When the contact 73a is permitted to return to its open position the solenoid 67a will be deenergized and the contact 66 will reclose. It will, of course, be evident that if the installation involves no downstream turbine, the float and controlled contact 73, and the solenoid operated switch 66 may be omitted, leaving the motor 58 controllable by the contact 73a. The position of the nut 55 can always be adjusted by the handwheel 57 when desired.

If it be assumed that the turbine 2 is shut down and that it is desired to start the turbine, either the hand wheel 57 or the contact 73a is moved in the proper direction to cause the nut 55 to move up from a low position a desired amount, thereby permitting the gates of turbine 2 to be opened an amount dependent upon the position of the load limit bell crank 27. The linkage between the servomotor 16 (and hence the turbine gates) and the control valve 60 is such that the control valve will be in the position shown on the drawing when the turbine gates have reached an opening determined by the gate limit setting.

From the foregoing it will be apparent to those skilled in the art that the illustrated embodiment of the invention provides a new and improved hydraulic turbine governing system and accordingly accomplishes the objects of the invention. On the other hand, it will also be obvious to those skilled in the art that the illustrated embodiment of the invention may be variously changed and modified, or features thereof, singly or collectively, embodied in other combinations than those illustrated, without departing from the spirit of the invention, or sacrificing all of the advantages thereof, and that accordingly the disclosure herein is illustrative only, and the invention is not limited thereto.

It is claimed and desired to secure by Letters Patent:

1. In a control system for a hydraulic turbine for supplying power to a variable load and having gates for controlling flow of water to said turbine; a servomotor for operating said gates; a governor responsive to the speed of said turbine for controlling said servomotor; gate limiting means for limiting opening of said gates by said servomotor to a desired amount regardless of gate opening action of said governor; bypass means for bypassing water around said turbine; bypass control means for controlling opening and closing said bypass means; means for adjusting said gate limiting means to permit increase of gate opening in response to action of said governor; means so connecting said adjusting means to said bypass control means that the aforesaid adjustment tends to cause opening of said bypass; and means so connecting said servomotor to said bypass control means that gate opening movement of said servomotor neutralizes the aforesaid tendency.

2. In a control system for a hydraulic turbine supplying power to a variable load at a substantially constant predetermined turbine speed and having gates for controlling flow of water to said turbine; bypass means for bypassing water around said turbine; bypass control means for controlling opening and closing of said bypass means; means for operating said gates; a governor responsive to the speed of said turbine for controlling said gate operating means, said governor acting to cause said gate operating means to move said gates to restore the turbine speed to the predetermined value upon changes in the load on said turbine; adjustable load limiting means for limiting opening of said gates to a desired amount regardless of gate opening action of said governor; a first means associated with said bypass control means tending to cause said bypass means to move in an opening direction upon adjustment of said load limiting means for increased load and to vice versa move said bypass means in a closing direction upon adjustment of said load limiting means for decreased load; and a second means associated with said bypass control means tending to oppose said tendency of said first means to cause said bypass means to move in an opening and closing direction, said second means causing said bypass means to move in a closing direction in response to gate opening movement of said gate operating means for increased load and vice versa causing said bypass means to move in an opening direction in response to gate closing movement of said gate operating means for decreased load; said first and second means being so coordinated that said opposing tendencies will be neutralized and said bypass means closed when the turbine is operating at the load corresponding to the setting of said load limiting means.

3. In a control system for a hydraulic turbine supplying power to a variable load at a substantially constant predetermined turbine speed and having gates for controlling flow of water to said turbine; bypass means for bypassing water around said turbine; bypass control means for controlling opening and closing of said bypass means; means for operating said gates; a governor responsive to the speed of said turbine for controlling said gate operating means, said governor acting to cause said gate operating means to move said gates to restore the turbine speed to the predetermined value upon changes in the load on said turbine; load limiting means for limiting opening of said gates to a desired amount regardless of gate opening action of said governor; means for adjusting said load limiting means; a first means associated with said bypass control means tending to cause said bypass means to move in an opening direction in response to adjustment of said load limiting means for increased load and to vice versa move said bypass means in a closing direction in response to adjustment of said gate limiting means for decreased load; and a second means associated with said bypass control means tending to oppose said tendency of said first means to cause said bypass means to move in an opening and closing direction, said second means causing said bypass means to move in a closing direction in response to gate opening movement of said gate operating means for increased load and vice versa causing said bypass means to move in an opening direction in response to gate closing movement of said gate operating means for decreased load; said first and second means being so coordinated that said opposing tendencies will be neutralized and the bypass means closed when the turbine is operating at the load corresponding to the setting of said load limiting means, and a net adjustment of said bypass control means by said oppositely acting first and second means in response to adjustment raising the load limit above actual load on the turbine and in response to closing movement of said gate operating means due to decreased load on the turbine below the predetermined load limit, said net adjustment being effective to cause the bypass means to open and maintain discharge through said bypass means equal to the difference between the discharge through the turbine corresponding to the predetermined setting of said load limit means, and the actual discharge through the turbine resulting from changes in the load upon the turbine.

4. In a control system for a hydraulic turbine supplying power to a variable load at a substantially constant predetermined turbine speed and having gates for controlling flow of water to said turbine; bypass means for bypassing water around said turbine; bypass control means for controlling opening and closing of said bypass means; means for operating said gates; a governor responsive to the speed of said turbine for controlling said gate operating means, said governor acting to cause said gate operating means to move said gates to restore the turbine speed to the predetermined value upon changes in the load on said turbine; load limiting means for limiting opening of said gates to a desired amount regardless of gate opening action of said governor; means responsive to variations in the turbine discharge water level for adjusting said load limiting means for increased load in response to a falling discharge water level and vice versa adjusting for decreased load in response to a rising discharge water level; a first means associated with said bypass control means tending to cause said bypass means to move in an opening direction in response to adjustment of said load limiting means for increased load and to vice versa move said bypass means in a closing direction in response to adjustment of said load limiting means for decreased load; and a second means associated with said bypass control means tending to oppose said tendency of said first means to cause said bypass means to move in an opening and closing direction, said second means causing said bypass means to move in a closing direction in response to gate opening movement of said gate operating means for increased load and vice versa causing said bypass means to move in an opening direction in response to gate closing movement of said gate operating means for decreased load; said first and second means being so coordinated that said opposing tendencies will be neutralized and the bypass means closed when the turbine is operating at the load corresponding to the setting of said load limiting adjusting means as determined by said water level responsive means, and a net adjustment of said bypass control means by said oppositely acting first and second means in response to an adjustment raising the load limit above actual load on the turbine and in response to gate closing movement of said gate operating means due to decreased load on the turbine below the predetermined load limit, said net adjustment being effective to cause the bypass means to open and maintain discharge through said bypass means equal to the difference between the discharge through the turbine corresponding to the setting of said load limit as determined by said water level responsive means, and the actual discharge through the turbine determined by the load on the turbine.

5. In a control system for a hydraulic turbine supplying power to a variable load at a substantially constant predetermined turbine speed and having gates for controlling flow of water to said turbine; bypass means for bypassing water around said turbine; bypass control means for controlling opening and closing of said bypass means; means for operating said gates; a governor responsive to the speed of said tubine for controlling said gate operating means, said governor acting to cause said gate operating means to move said gates to restore the turbine speed to said predetermined value upon changes in the load on said turbine; load limiting means for limiting opening of said gates to a desired amount; and means for adjusting said load limiting means coordinated with said bypass control means, to adjust said load limit for increased load and said bypass control means for increased flow through said bypass means and vice versa adjust said load limit for decreased load and said bypass control means for decreased flow through said bypass means.

6. In a control system for a hydraulic turbine supplying power to a variable load at a substantially constant predetermined turbine speed and having gates for controlling flow of water to said turbine; bypass means for bypassing water around said turbine; bypass control means for controlling opening and closing of said bypass means; means for operating said gates; a governor responsive to the speed of said turbine for controlling said gate operating means, said governor acting to cause said gate operating means to move said gates to restore the turbine speed to said predetermined value upon changes in the load on said turbine; load limiting means for limiting opening of said gates; and means responsive to variations in the turbine discharge water level for adjusting said load limiting means and said bypass control means, to adjust said load limit for increased load and said bypass control means for increased flow through said bypass means in response to falling turbine discharge water level and vice versa adjust said load limit for decreased load and said bypass control means for decreased flow through said bypass means in response to rising turbine discharge water level.

7. In a control system for a hydraulic turbine supplying power to a variable load at a substantially constant predetermined turbine speed and having gates for controlling flow of water to said turbine; bypass means for bypassing water around said turbine; bypass control means for controlling opening and closing of said bypass means; means for operating said gates; a governor responsive to the speed of said turbine for controlling said gate operating means, said governor acting to cause said gate operating means to move said gates to restore the turbine speed to said predetermined value upon changes in the load on said turbine; load limiting means for limiting opening of said gates; means responsive to variations in the turbine discharge water level for adjusting said load limiting means and said bypass control means, to adjust said load limit for increased load and said bypass control means for increased flow through said bypass means in response to falling turbine discharge water level and vice versa adjust said load limit for decreased load and said bypass control means for decreased flow through said bypass means in response to rising turbine discharge water level; and means for effecting as desired said adjustments of said load limiting means and said bypass control means regardless of the position of said discharge water level responsive means.

8. In a control system for a hydraulic turbine supplying power to a variable load at a substantially constant predetermined turbine speed and having gates for controlling flow of water to said turbine; a fluid operated servomotor for opening and closing said gates; a pilot valve for controlling the flow of actuating fluid to said servomotor; a governor responsive to the speed of said turbine for adjusting said pilot valve to cause said servomotor to move said gates to restore turbine speed to said predetermined value upon changes in the load on the turbine; fluid operated bypass means for bypassing water around said turbine; a valve for controlling the flow of actuating fluid to said bypass means; a bypass control leverage including an adjustable fulcrum for controlling said valve; a load limit mechanism including a leverage with a fulcrum adjustable to cause said mechanism to engage said servomotor pilot valve to limit as desired an adjustment of the pilot valve tending to open the turbine gates; a leverage responsive to movement of said servomotor for adjusting said bypass control leverage to open said bypass means in response to gate closing movement of said servomotor and vice versa adjust said bypass control leverage to close said bypass means in response to gate opening movement of said servomotor; and means for simultaneously adjusting the fulcrums of said load limit mechanism and said bypass control leverage to cause said bypass means to move in an opening direction in response to adjustment of said load limit mechanism for increased load and vice versa cause said bypass means to move in a closing direction in response to adjustment of said load limit mechanism for decreased load.

9. In a control system for a hydraulic turbine supplying power to a variable load at a substantially constant predetermined turbine speed and having gates for controlling flow of water to said turbine; a fluid operated servomotor for opening and closing said gates; a pilot valve for controlling the flow of actuating fluid to said servomotor; a governor responsive to the speed of said turbine for adjusting said pilot valve to cause said servomotor to move said gates to restore turbine speed to said predetermined valve upon changes in the load on the turbine; fluid operated bypass means for bypassing water around said turbine; a valve for controlling the flow of actuating fluid to said bypass means; a bypass control leverage including an adjustable fulcrum for controlling said valve; a load limit mechanism including a leverage with a fulcrum adjustable to cause said mechanism to engage said servomotor pilot valve to limit as desired an adjustment of the pilot valve tending to open the turbine gates; a leverage responsive to movement of said servomotor for adjusting said bypass control leverage to open said bypass means in response to gate closing movement of said servomotor and vice versa adjust said bypass control leverage to close said bypass means in response to gate opening movement of said servomotor; and means responsive to variations in the turbine discharge water level for adjusting the fulcrums of said load limit mechanism and said bypass control leverage to cause said bypass means to move in an opening direction and said load mechanism to be adjusted for increased load in response to falling turbine discharge water level, and vice versa to cause said bypass means to move in a closing direction and said load limit mechanism to be adjusted for decreased load in response to rising turbine discharge water level.

10. In a control system for a hydraulic turbine supplying power to a variable load at a substantially constant predetermined turbine speed and having gates for controlling flow of water to said turbine; a fluid operated servomotor for opening and closing said gates; a pilot valve for controlling the flow of actuating fluid to said servomotor; a governor responsive to the speed of said turbine for adjusting said pilot valve to cause said servomotor to move said gates to restore turbine speed to said predetermined value upon changes in the load on the turbine; fluid operated bypass means for bypassing water around said turbine; a valve for controlling the flow of actuating fluid to said bypass means; a bypass control leverage including an adjustable fulcrum for controlling said valve; a load limit mechanism including a leverage with a fulcrum adjustable to cause said mechanism to engage said servomotor pilot valve to limit as desired an adjustment of the pilot valve tending to open the turbine gates; a leverage responsive to movement of said servomotor for adjusting said bypass control leverage to open said bypass means in response to gate closing movement of said servomotor and vice versa adjust said bypass control leverage to close said bypass means in response to gate opening movement of said servomotor; and an electric motor responsive to rising and falling movement of a float in the turbine afterbay for adjusting the fulcrums of said load limit mechanism and said bypass control leverage to cause said bypass means to move in an opening direction and said load mechanism to be adjusted for increased load in response to falling turbine discharge water level, and vice versa to cause said bypass means to move in a closing direction and said load limit mechanism to be adjusted for decreased load in response to rising turbine discharge water level.

11. In a control system for a hydraulic turbine supplying power to a variable load at a substantially constant predetermined turbine speed and having gates for controlling flow of water to said turbine; a fluid operated servomotor for opening and closing said gates; a pilot valve for controlling the flow of actuating fluid to said servomotor; a governor responsive to the speed of said turbine for adjusting said pilot valve to cause said servomotor to move said gates to restore turbine speed to said predetermined value upon changes in the load on the turbine; fluid operated bypass means for bypassing water around said turbine; a valve for controlling the flow of actuating fluid to said bypass means; a bypass control leverage including an adjustable fulcrum for controlling said valve; a load limit mechanism including a leverage with a fulcrum adjustable to cause said mechanism to engage said servomotor pilot valve to limit as desired an adjustment of the pilot valve tending to open the turbine gates; a leverage responsive to movement of said servomotor for adjusting said bypass control leverage to open said bypass means in response to gate closing movement of said servomotor and vice versa adjust said bypass control leverage to close said bypass means in response to gate opening movement of said servomotor; an electric motor responsive to rising and falling movement of a float in the turbine afterbay for adjusting the fulcrums of said load limit mechanism and said bypass control leverage to cause said bypass means to move in an opening direction and said load mechanism to be adjusted for increased load in response to falling turbine discharge water level, and vice versa to cause said bypass means to move in a closing direction and said load limit mechanism to be adjusted for decreased load in response to rising turbine discharge water level; and hand operable means for affecting said adjustments of said fulcrums regardless of the water level in the turbine afterbay.

12. In a control system for a hydraulic turbine supplying power to a variable load at a substantially constant predetermined turbine speed and having gates for controlling flow of water to said turbine; bypass means for bypassing water around said turbine; an adjustable bypass control leverage for opening and closing of said bypass means; a servomotor for operating said gates; a governor responsive to the speed of said turbine for controlling said servomotor, said governor acting to cause said servomotor to move said gates to restore the turbine speed to the predetermined value upon changes in the load on said turbine; a load limiting mechanism, said mechanism including a leverage operable to control movement of said servomotor and movable about a fulcrum that is adjustable to limit opening of said gates to a desired amount regardless of gate opening action of said governor; a first means associated with said bypass control leverage and said load limiting mechanism, tending to cause said bypass means to move in an opening direction in response to adjustment of said fulcrum for increased load and to vice versa move said bypass means in a closing direction in response to adjustment of said fulcrum for decreased load; and a second means associated with said bypass control leverage and said servomotor, tending to oppose said tendency of said first means to cause said bypass means to move in an opening and closing direction, said second means causing said bypass to move in a closing direction in response to gate opening movement of said servomotor for increased load and vice versa move said bypass means in an opening direction in response to gate closing movement of said servomotor for decreased load; said first and second means being so coordinated that said opposing tendencies will be neutralized and said bypass means closed when the turbine is operating at the load corresponding to the setting of said load limiting mechanism.

13. In a control system for a hydraulic turbine supplying power to a variable load at a substantially constant predetermined turbine speed and having gates for controlling flow of water to said turbine; bypass means for bypassing water around said turbine; an adjustable bypass control leverage for opening and closing of said bypass means; a servomotor for operating said gates; a governor responsive to the speed of said turbine for controlling said servomotor, said governor acting to cause said servomotor to move said gates to restore the turbine speed to the predetermined value upon changes in the load on said turbine; a load limit mechanism, said mechanism including a leverage operable to control movement of said servomotor and movable about a fulcrum that is adjustable to limit opening of said gates to a desired amount regardless of gate opening action of said governor; a first means associated with said bypass control leverage and said load limiting mechanism, tending to cause said bypass means to move in an opening direction in response to adjustment of said fulcrum for increased load and to vice versa move said bypass means in a closing direction in response to adjustment of said fulcrum for decreased load; and a second means associated with said bypass control leverage and said servomotor, tending to oppose said tendency of said first means to cause said bypass means to move in an opening and closing direction, said second means causing said bypass means to move in a closing direction in response to gate opening movement of said servomotor for increased load and vice versa move said bypass means in an opening direction in response to gate closing movement of said servomotor for decreased load; said first and second means being so coordinated that said opposing tendencies will be neutralized and the bypass means closed when the turbine is operating at the load corresponding to the setting of said load limit mechanism and a net adjustment of said bypass control leverage by said oppositely acting first and second means in response to adjustment raising the load limit above actual load on the turbine and in response to gate closing movement of said servomotor due to decreased load on the turbine below the predetermined load limit, said net adjustment being effective to cause the bypass means to open and maintain discharge through said bypass means equal to the difference between the discharge through the turbine corresponding to the predetermined setting of said load limit mechanism, and the actual discharge through the turbine determined by the load on the turbine.

14. In a control system for a hydraulic turbine supplying power to a variable load at a substantially constant predetermined turbine speed and having gates for controlling flow of water to said turbine; bypass means for bypassing water around said turbine; an adjustable bypass control leverage for controlling opening and closing of said bypass means; a servomotor for operating said gates; a governor responsive to the speed of said turbine for controlling said servomotor, said governor acting to cause said servomotor to move said gates to restore the turbine speed to the predetermined value upon changes in the load on said turbine; a load limit mechanism, said mechanism including a leverage operable to control movement of said servomotor and movable about a fulcrum that is adjustable to limit opening of said gates to a desired amount regardless of gate opening action of said governor; means responsive to variations in the turbine discharge water level for adjusting said load limiting mechanism for increased load in response to a falling discharge water level and vice versa adjusting for decreased load in response to a rising discharge water level; a first means associated with said bypass control leverage and said load limit mechanism, tending to cause said bypass to move in an opening direction in response to adjustment of said fulcrum for increased load and to vice versa move said bypass means in a closing direction in response to adjustment of said fulcrum for decreased load; and a second means associated with said bypass control leverage and said servomotor acting to oppose said tendency of said first means and adjust said bypass control leverage to cause said bypass means to move in a closing direction in response to gate opening movement of said servomotor for increased load and vice versa move said bypass means in an opening direction in response to gate closing movement of said servomotor for decreased load; said first and second means being so coordinated that said opposing tendencies will be neutralized and the bypass means closed when the turbine is operating at the load corresponding to the setting of said load limit mechanism in response to said water level responsive means, and a net adjustment of said bypass control leverage by said oppositely acting first and second means in response to adjustment raising the load limit above actual load on the turbine and in response to gate closing movement of said servomotor due to decreased load on the turbine below the predetermined load limit, said net adjustment being effective to cause the bypass means to open and maintain discharge through said bypass means equal to the difference between the discharge through the turbine corresponding to the setting of said load limit mechanism as determined by said water level responsive means, and the actual discharge through the turbine determined by the load on the turbine.

15. In a control system for a hydraulic turbine supplying power to a variable load at a substantially constant predetermined turbine speed and having gates for controlling flow of water to said turbine; bypass means for bypassing water around said turbine; an adjustable control leverage including a fulcrum adjustable for controlling opening and closing of said bypass means; a fluid operated servomotor for operating said gates; a pilot valve for controlling flow of actuating fluid to said servomotor; a governor responsive to the speed of said turbine for controlling said pilot valve, said governor acting to position said pilot valve so as to cause said servomotor to move said gates to restore the turbine speed to the predetermined value upon changes in the load on said turbine; a load limit mechanism, said mechanism including a leverage engageable with said pilot valve and movable about a fulcrum that is adjustable to limit opening of said gates to a desired amount regardless of gate opening action of said governor; a first means associated with the fulcrum of said bypass control leverage and the fulcrum of said load limit mechanism acting to cause said bypass means to move in an opening direction in response to adjustment of said load limit mechanism for increased load and to vice versa move said bypass means in a closing direction in response to adjustment of said load limit mechanism for decreased load; and a second means responsive to movement of said servomotor and connected with said bypass control leverage, acting to oppose the action of said first means and adjust said bypass control leverage to close said bypass means in response to gate opening movement of said servomotor for increased load and vice versa open said bypass means in response to gate closing movement of said servomotor for decreased load; said first and second means being so coordinated that the opposing actions thereof upon said bypass control leverage will be neutralized and said bypass means closed when the turbine is operating at the load corresponding to the setting of said load limiting mechanism.

16. In a control system for a hydraulic turbine supplying power to a variable load at a substantially constant predetermined turbine speed and having gates for controlling flow of water to said turbine; bypass means for bypassing water around said turbine; an adjustable bypass control leverage including a fulcrum adjustable for controlling opening and closing of said bypass means; a fluid operated servomotor for operating said gates; a pilot valve for controlling flow of actuating fluid to said servomotor; a governor responsive to the speed of said turbine for controlling said pilot valve, said governor acting to position said pilot valve so as to cause said servomotor to move said gates to restore the turbine speed to the predetermined value upon changes in the load on said turbine; a load limit mechanism, said mechanism including a leverage engageable with said pilot valve and movable about a fulcrum that is adjustable to limit opening of said gates to a desired amount regardless of gate opening action of said governor; a first means associated with the fulcrum of said bypass control leverage and the fulcrum of said load limit mechanism acting to cause said bypass means to move in an opening direction in response to adjustment of said load limit mechanism for increased load and to vice versa move said bypass means in a closing direction in response to adjustment of said load limit mechanism for decreased load; and a second means responsive to movement of said servomotor and connected with said bypass control leverage, acting to oppose the action of said first means and adjust said bypass control leverage to close said bypass means in response to gate opening movement of said servomotor for increased load and vice versa open said bypass means in response to gate closing movement of said servomotor for decreased load; said first and second means being so coordinated that the opposing actions thereof adjusting the bypass control leverage will be neutralized and the bypass means closed when the turbine is operating at the load corresponding to the setting of said load limit mechanism, and a net adjustment of said bypass control leverage by said oppositely acting first and second means in response to adjustment raising the load limit above actual load on the turbine and in response to gate closing movement of said servomotor due to decreased load on the turbine below the predetermined load limit, said net adjustment being effective to cause the bypass means to open and maintain discharge through said bypass means equal to the difference between the discharge through the turbine corresponding to the predetermined setting of said load limit, and the actual discharge through the turbine as determined by the load on the turbine.

17. In a control system for a hydraulic turbine supplying power to a variable load at a substantially constant predetermined turbine speed and having gates for controlling flow of water to said turbine; bypass means for bypassing water around said turbine; an adjustable bypass control leverage including a fulcrum adjustable for controlling opening and closing of said bypass means; a fluid operated servomotor for operating said gates; a pilot valve for controlling flow of actuating fluid to said servomotor; a governor responsive to the speed of said turbine for controlling said pilot valve, said governor acting to position said pilot valve so as to cause said servomotor to move said gates to restore the turbine speed to the predetermined value upon changes in the load on said turbine; a load limit mechanism, said mechanism including a leverage engageable with said pilot valve and movable about a fulcrum that is adjustable to limit opening of said gates to a desired amount regardless of gate opening action of said governor; an electric motor responsive to rising and falling movement of a float in the afterbay of said turbine for adjusting said load limit mechanism for increased load in response to a falling discharge water level and vice versa adjusting for decreased load in response to a rising discharge water level; a first means associated with the fulcrum of said bypass control leverage and the fulcrum of said load limit mechanism acting to cause said bypass means to move in an opening direction in response to adjustment of said load limit mechanism for increased load and to vice versa move said bypass means in a closing direction in response to adjustment of said load limit mechanism for decreased load; and a second means responsive to movement of said servomotor and connected with said bypass control leverage, acting to oppose the action of said first means and adjust said bypass control leverage to close said bypass means in response to gate opening movement of said servomotor for increased load and vice versa open said bypass means in response to gate closing movement of said servomotor for decreased load; said first and second means being so coordinated that the opposing actions thereof adjusting the bypass control leverage will be neutralized and the bypass means closed when the turbine is operating at the load corresponding to the setting of said load limit mechanism in response to the water level in the afterbay of said turbine, and a net adjustment of said bypass control leverage by said oppositely acting first and second means in response to adjustment raising the load limit above actual load on the turbine and in response to gate closing movement of said servomotor due to decreased load on the turbine below the predetermined load limit, said net adjustment being effective to cause the bypass means to open and maintain discharge through said bypass means equal to the difference between the discharge through the turbine corresponding to the setting of said load limit mechanism as determined by the water level in said turbine afterbay, and the actual discharge through the turbine determined by the load on the turbine.

WILLIAM J. RHEINGANS.
BEVERLY R. NICHOLS.

References Cited in the file of this patent

UNITED STATES PATENTS

| Number | Name | Date |
|---|---|---|
| 1,706,813 | Pfau | Mar. 26, 1929 |
| 2,067,460 | Pfau | Jan. 12, 1939 |
| 2,343,223 | Pfau et al. | Feb. 29, 1944 |